US012014360B2

(12) United States Patent
Shteynberg et al.

(10) Patent No.: US 12,014,360 B2
(45) Date of Patent: *Jun. 18, 2024

(54) GAIN AND LOSS COMPUTATION FOR CRYPTOCURRENCY TRANSACTIONS

(71) Applicant: Lukka, Inc., Naples, FL (US)

(72) Inventors: Vadim Shteynberg, Ardsley, NY (US); Alexander Zakharov, Croton on Hudson, NY (US)

(73) Assignee: Lukka, Inc., Naples, FL (US)

( * ) Notice: Subject to any disclaimer, the term of this patent is extended or adjusted under 35 U.S.C. 154(b) by 257 days.

This patent is subject to a terminal disclaimer.

(21) Appl. No.: 16/544,576

(22) Filed: Aug. 19, 2019

(65) Prior Publication Data

US 2020/0202337 A1    Jun. 25, 2020

Related U.S. Application Data

(60) Provisional application No. 62/782,605, filed on Dec. 20, 2018.

(51) Int. Cl.
  *G06Q 20/00* (2012.01)
  *G06N 20/00* (2019.01)
  (Continued)

(52) U.S. Cl.
  CPC ......... *G06Q 20/3678* (2013.01); *G06N 20/00* (2019.01); *G06Q 40/04* (2013.01); *G06Q 40/123* (2013.12)

(58) Field of Classification Search
  CPC .. G06Q 20/3678; G06Q 40/123; G06Q 40/04; G06N 20/00
  See application file for complete search history.

(56) References Cited

U.S. PATENT DOCUMENTS 8,583,516 B1   11/2013   Pitt et al.
8,838,944 B2 *  9/2014   Chen .................... G06F 9/3004
                                                 712/225
(Continued)

FOREIGN PATENT DOCUMENTS

CA         2792894 A1    8/2011
CN     107402824 A   * 11/2017   ......... G06F 16/1805
(Continued)

OTHER PUBLICATIONS

PCT Notification Concerning Transmittal of the International Preliminary Report on Patentability for PCT Application No. PCT/US2019/067607, dated Jul. 1, 2021, 7 pages.
(Continued)

*Primary Examiner* — Rajesh Khattar
(74) *Attorney, Agent, or Firm* — Perkins Coie LLP

(57) ABSTRACT

Systems and methods for gain and loss computation for cryptocurrency transactions. An example method comprises: storing a plurality of cryptocurrency acquisition transactions in an ascending order of respective transaction timestamps; storing a plurality of cryptocurrency disposal transactions in an ascending order of respective transaction timestamps; selecting a cryptocurrency disposal transaction of the plurality of cryptocurrency disposal transactions; selecting, from the plurality of cryptocurrency acquisition transactions, one or more cryptocurrency acquisition transactions, such that a timestamp of each selected cryptocurrency acquisition transaction is less than a timestamp of the selected cryptocurrency disposal transaction; matching the selected cryptocurrency disposal transaction with at least a subset of the selected one or more cryptocurrency acquisition transactions; determining, for each of the matched transactions, a corresponding fiat currency transaction amount; and computing, using the fiat currency transaction amounts, one of: a gain associated with the cryptocurrency (Continued)

US 12,014,360 B2

Page 2 disposal transaction or a loss associated with the cryptocurrency disposal transaction.

20 Claims, 7 Drawing Sheets

(51) Int. Cl.
  *G06Q 20/36* (2012.01)
  *G06Q 40/04* (2012.01)
  *G06Q 40/12* (2023.01)

(56) References Cited

U.S. PATENT DOCUMENTS

| | | | |
|---|---|---|---|
| 9,459,876 B2* | 10/2016 | Giroux | G06F 9/3851 |
| 10,127,552 B2 | 11/2018 | Ronca et al. | |
| 10,621,678 B1 | 4/2020 | Ramotar et al. | |
| 2004/0024665 A1 | 2/2004 | Foster | |
| 2004/0167824 A1 | 8/2004 | Singh et al. | |
| 2006/0155632 A1 | 7/2006 | Cherkas et al. | |
| 2008/0189195 A1 | 8/2008 | Xia et al. | |
| 2009/0024536 A1 | 1/2009 | Archer et al. | |
| 2010/0318858 A1 | 12/2010 | Essawi et al. | |
| 2012/0101922 A1 | 4/2012 | Hakim | |
| 2013/0246233 A1 | 5/2013 | Hakim | |
| 2014/0180883 A1 | 6/2014 | Regan | |
| 2015/0170112 A1 | 6/2015 | DeCastro | |
| 2015/0220928 A1 | 8/2015 | Allen | |
| 2015/0262139 A1 | 9/2015 | Shtylman | |
| 2015/0294425 A1* | 10/2015 | Benson | G06Q 40/123 705/31 |
| 2015/0324789 A1 | 11/2015 | Dvorak et al. | |
| 2016/0012465 A1 | 1/2016 | Sharp | |
| 2016/0342977 A1 | 11/2016 | Lam | |
| 2018/0067889 A1* | 3/2018 | Brown | G06F 13/4221 |
| 2018/0101585 A1* | 4/2018 | Curtis | G06F 16/258 |
| 2018/0102935 A1* | 4/2018 | Curtis | H04L 43/045 |
| 2018/0158048 A1 | 6/2018 | Narasimhan et al. | |
| 2018/0247191 A1 | 8/2018 | Katz et al. | |
| 2018/0300749 A1 | 10/2018 | Truong | |
| 2018/0330440 A1 | 11/2018 | Melton | |
| 2018/0350006 A1 | 12/2018 | Agrawal et al. | |
| 2019/0130392 A1 | 5/2019 | Kale | |
| 2020/0074416 A1 | 3/2020 | Mathew | |
| 2021/0056549 A1* | 2/2021 | Shteynberg | G06Q 20/065 |
| 2021/0097609 A1* | 4/2021 | Shteynberg | G06Q 20/401 |
| 2021/0279778 A1* | 9/2021 | Preston | G06Q 30/0283 |

FOREIGN PATENT DOCUMENTS

| | | | |
|---|---|---|---|
| JP | 2004213283 A | 7/2004 | |
| JP | 2009538589 A | 11/2009 | |
| JP | 2017059164 A | 3/2017 | |
| JP | 6409115 B1 | 9/2018 | |
| WO | 2014210311 A1 | 12/2014 | |
| WO | 2018002830 A1 | 1/2018 | |

OTHER PUBLICATIONS

PCT Notification Of Transmittal Of The International Search Report And The Written Opinion Of The International Searching Authority for PCT Application No. PCT/US19/67622, dated Mar. 3, 2020, 23 pages.
PCT Notification Of Transmittal Of The International Search Report And The Written Opinion Of The International Searching Authority for PCT Application No. PCT/US19/67616, dated Mar. 3, 2020, 17 pages.
PCT Notification of Transmittal Of The International Search Report And The Written Opinion Of The International Search Authority for PCT Application for PCT/US19/67607, dated Mar. 11, 2020, 9 pages.
Schon, Wolfgang, "A Common Consolidated Corporate Tax Base for Europe", Springer, 2008, p. 37.
Blockchain Intelligence, Coinalytics, [website], [accessed on Mar. 6, 2016], <http://coinalytics.co/>, 2015, 4 pages.
Calculate Bitcoin Taxes for Capital Gains and Income, Bitcoin Taxes, [website], [retrieved on Mar. 6, 2016, Retrieved from: < https://bitcoin.tax>, 2016, 4 pages.
Coin Ledger, Coinbase, [website], [accessed on Mar. 6, 2016], <https://www.coinbase.com>, 4 pages.
Coinbase, [website], [accessed on Mar. 6, 2016], Retrieved from: <https://support.coinbase.com>, 2016, 3 pages.
Blockchain Solutions for Business, Coyno, [online], [accessed on Mar. 6, 2016], Retrieved from: <coyno.com>, 4 pages.
Kryptokit, [website], [accessed on Mar. 6, 2016], Retrieved from: <http://kryptokit.com>, 4 pages.
Tapeke, [website], <http://tapeke.com>, 2015, 4 pages.
U.S. Appl. No. 16/544,555, filed Aug. 19, 2019.
U.S. Appl. No. 16/703,303, filed Dec. 4, 2019.
USPTO, Office Action for U.S. Appl. No. 16/703,303, dated Mar. 4, 2021.
USPTO, Final Office Action for U.S. Appl. No. 16/703,303, dated Nov. 12, 2021.
USPTO, Office Action for U.S. Appl. No. 16/544,555, dated Aug. 12, 2021.
USPTO, Final Office Action for U.S. Appl. No. 16/544,555, dated Jan. 12, 2022.
Mpinyuri, Elton Batanai: Thesis: Beyond Cryptocurrencies: Financial Applications of Blockchain Technology: University of Johannesburg (South Africa). ProQuest Dissertations Publishing, 2019. 28279700. (Year: 2019).
Sewpersadh, Natisha: Thesis: Knowledge-Mapping of Blockchain Technology Applications fora Banking Institution: University of Johannesburg (South Africa). ProQuest Dissertations Publishing, 2019. 28281118 (Year: 2019).
PCT Notification Concerning Transmittal of International Preliminary Report on Patentability for PCT Application No. PCT/US2019/067616, dated Jul. 1, 2021, 8 pages.
PCT Notification Concerning Transmittal of International Preliminary Report on Patentability for PCT Application No. PCT/US2019/067622, dated Jul. 1, 2021, 6 pages.
USPTO, Office Action for U.S. Appl. No. 16/703,303, dated Aug. 11, 2022.
AU Examination Report No. 1 for AU Application No. 2019404304, dated Apr. 28, 2022, 3 pages.
Kaur, Navleen et al; Bitcoin: An Investment Management Tool-Comparison between risk and average returns of different financial assets with BTC/ IEEE Xplore: Date of Conference: Jan. 19-21, 2021 (Year: 2021).
Nascimento, Lara et al; Bockchain's potential and opportunities for tax administrations: a systematic review: IEEE Xplore: Date of Conference: Nov. 15-17, 2021 (Year: 2021).
USPTO, Final Office Action for U.S. Appl. No. 16/703,303, dated Aug. 23, 2022.
The extended European search report for EP Application No. 19899125.9, dated Aug. 4, 2022, 9 pages.
Kartik Hegadekatti et al: "Munich Personal RePEc Archive Examining Taxation of Fiat Money and Bitcoins Vis-A-Vis Regulated Cryptocurrencies", Oct. 2, 2016 (Oct. 2, 2016), pp. 1-10, XP055946072, Retrieved from the Internet: URL:https://mpra.ub.uni-muenchen.de/82073/ 1/MPRA_paper_82073.pdf [retrieved on Jul. 25, 2022].
USPTO, Office Action for U.S. Appl. No. 16/703,303, dated Jan. 18, 2023.
USPTO, Office Action for U.S. Appl. No. 16/544,555, dated Nov. 1, 2022.
AU Examination Report No. 1 for AU Application No. 2019404304, dated Jan. 23, 2023, 2 pages.
CA Office Action for Canadian Patent Application No. 3124470 dated Nov. 7, 2022, 4 pages.
Navieen Kaur et al: Bitcoin: An Investment Management Tool-Comparison between risk and average returns of different financial assets with BTC; IEEE XPLORE: Date of Conference: Jan. 19-21, 2021.

(56) References Cited

OTHER PUBLICATIONS

Lara Nascimento et al: Blockchain's potential and opportunities for tax administrations: a systematic review: IEEE XPLORE: Date of Conference: Nov. 15-17, 2021.
JP Office Action for Application No. JP 2021-536081, dated Oct. 11, 2022, 12 pages.
USPTO, Final Office Action for U.S. Appl. No. 16/703,303, dated May 18, 2023.
USPTO, Advisory Action for U.S. Appl. No. 16/544,555, dated May 3, 2023.
JP Final Office Action for Application No. JP 2021-536081, dated May 15, 2023, 6 pages.

\* cited by examiner

GAIN AND LOSS COMPUTATION FOR CRYPTOCURRENCY TRANSACTIONS

REFERENCE TO RELATED APPLICATION

This application is related to and claims the benefit of U.S. Provisional Patent Application No. 62/782,605, filed Dec. 20, 2018, the entirety of which is incorporated herein by reference.

TECHNICAL FIELD

The present disclosure is generally related to computer systems, and is specifically related to methods and systems for gain and loss computation for cryptocurrency transactions.

BACKGROUND

"Cryptocurrency" herein shall refer to is a digital asset utilized as means of exchange; a typical cryptocurrency employs strong cryptography to control creation of new cryptocurrency units and validate exchange transactions. Certain transactions in cryptocurrency may represent taxable events, as defined by pertinent laws.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for gain and loss computations for cryptocurrency transactions.

Certain transactions in cryptocurrency, such as crypto asset disposals, may represent taxable events. While taxation rules are usually jurisdiction-dependent, an asset disposal transaction would usually entail realization of gain or loss, which generally represents a taxable event in various jurisdictions, including, e.g., the United States.

In order to compute the gain or loss associated with a given set of cryptocurrency transactions, the computer system implementing the systems and methods described herein may receive and parse transaction records related to cryptocurrency trades and transfers performed by a single person (e.g., a natural person or a corporation) via one or more cryptocurrency accounts associated with one or more cryptocurrency exchanges and/or other organizations that perform cryptocurrency transactions. Based on the extracted transaction information, the computer system may determine the transaction types, amounts, currencies, timestamps, and other relevant information carried by the transaction records being analyzed. In various illustrative examples, the transaction types include: acquisition transactions, disposal transactions, deposit transactions, withdrawal transaction, fee payment transactions, and/or various other types.

The computer system may store the acquisition transaction records in an acquisition transaction queue and may further store the disposal transaction records in a disposal transaction queue. Each of the queues may be sorted in the ascending order of the transaction timestamps, and may be stored in one or more files residing in a volatile and/or non-volatile memory. One or more acquisition transactions may then matched to each disposal transaction; for each disposal transaction and the matched acquisition transactions, the resulting gain or loss may be computed, as described in more detail herein below.

Thus, the present disclosure provides efficient methods of gain and loss computations for cryptocurrency transactions, which are described in more detail herein below. The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in detail herein below by way of examples, rather than by way of limitation.

Figure 1:
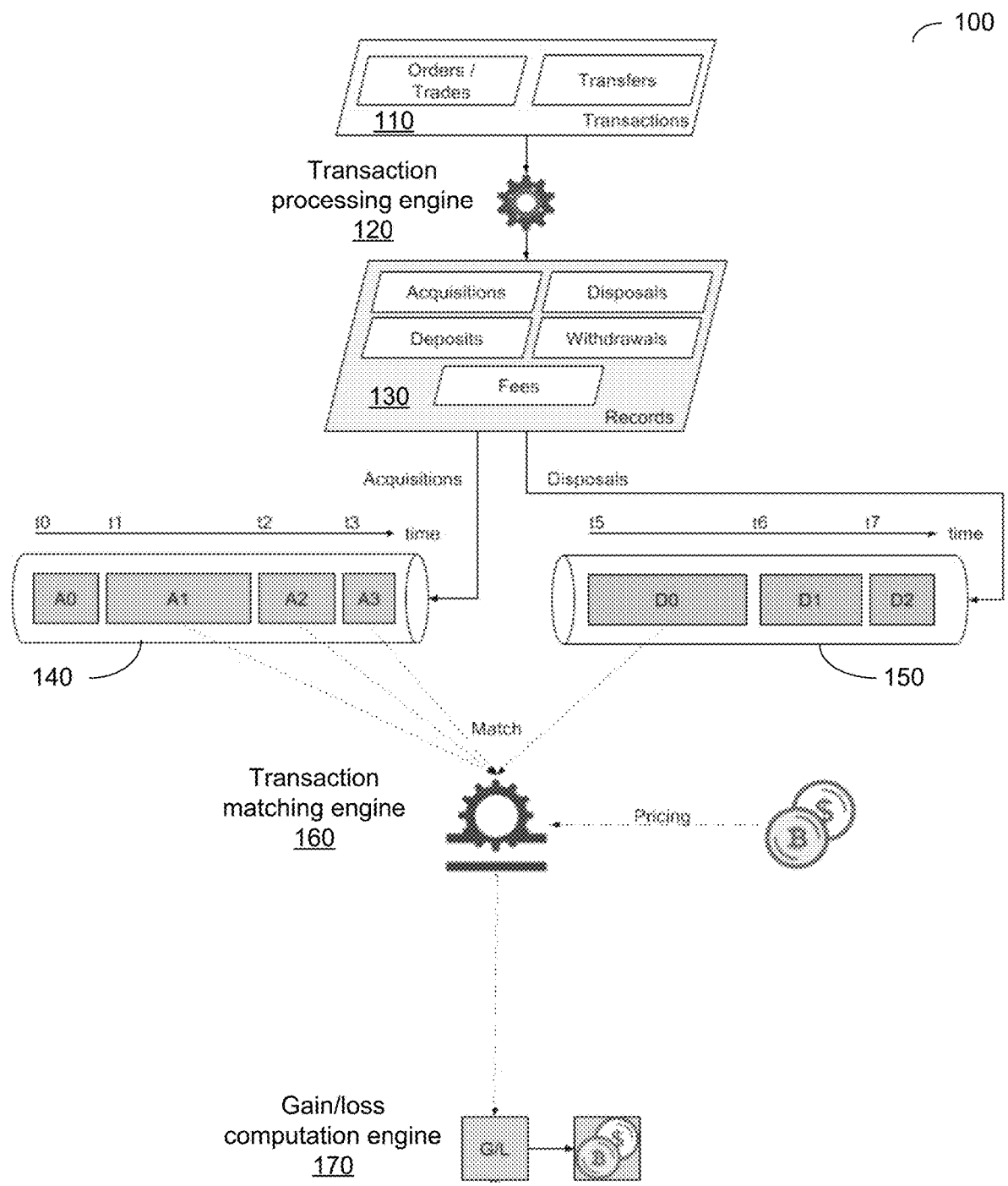
FIG. 1 schematically illustrates an example workflow for gain and loss computation for cryptocurrency transactions, in accordance with one or more aspects of the present disclosure.

FIG. 1 schematically illustrates an example workflow of computing gain or loss for cryptocurrency transactions. As schematically illustrated by FIG. 1, the computer system 100 implementing the systems and methods described herein may receive transaction records 110 which are related to cryptocurrency trades and transfers performed by a single person (e.g., a natural person or a corporation) via one or more cryptocurrency accounts associated with one or more cryptocurrency exchanges and/or other organizations that perform cryptocurrency transactions. The transaction records, which may come in various formats, are then processed by the transaction processing engine 120, which may be implemented by one or more software modules running in one or more dedicated virtual or physical execution environments (e.g., virtual or physical servers) or collocated with other components of the system. The transaction processing engine 120 may implement a parser which, for a given transaction record, may extract the transaction amount(s), the transaction currency(-ies), the timestamp, and/or various other information. Based on the extracted information, the transaction processing engine 120 may determine the transaction type associated with the transaction record being analyzed. In various illustrative examples, the transaction types include: acquisition transactions, disposal transactions, deposit transactions, withdrawal transaction, fee payment transactions, and/or various other types. The transaction types may include, e.g., acquisition transactions, disposal transactions, deposit transactions, withdrawal transactions, fee payment transactions, etc.

The transaction processing engine 120 may further perform pre-processing of the transaction records, which may involve converting the transaction records into a certain format, normalizing cryptocurrency designators, validating and/or modifying various other transaction record fields. The pre-processed transaction records 130 may be stored in one or more files residing in a volatile and/or non-volatile memory.

Based on the determined transaction types, the transaction processing engine 120 may append the acquisition transaction records to the acquisition transaction queue 140, and may further append the disposal transaction records to the disposal transaction queue 150. Each of the queues may be sorted in the ascending order of the transaction timestamps, such that the records reflecting the most recent transactions are found at the tail of the queue, while the records reflecting the least recent transactions are found at the head of the queue. The acquisition transaction queue 140 and the disposal transaction queue 150 may be stored in one or more files residing in a volatile and/or non-volatile memory. While the example implementations herein are described with references to the acquisition transaction queue 140 and the disposal transaction queue 140, linked lists or other suitable data structures may be employed instead of the queues.

The disposal and acquisition transactions may then matched by the transaction matching engine 160, which may be implemented by one or more software modules running in one or more dedicated virtual or physical execution environments (e.g., virtual or physical servers) or collocated with other components of the system. As disposal transactions may represent taxable events (i.e., gain or loss may be realized as the result of disposing of previously acquired cryptocurrency assets), a disposal transaction may only be matched with one or more acquisition transactions which occurred before the disposal transaction, irrespectively of a particular accounting method used.

Figure 2:
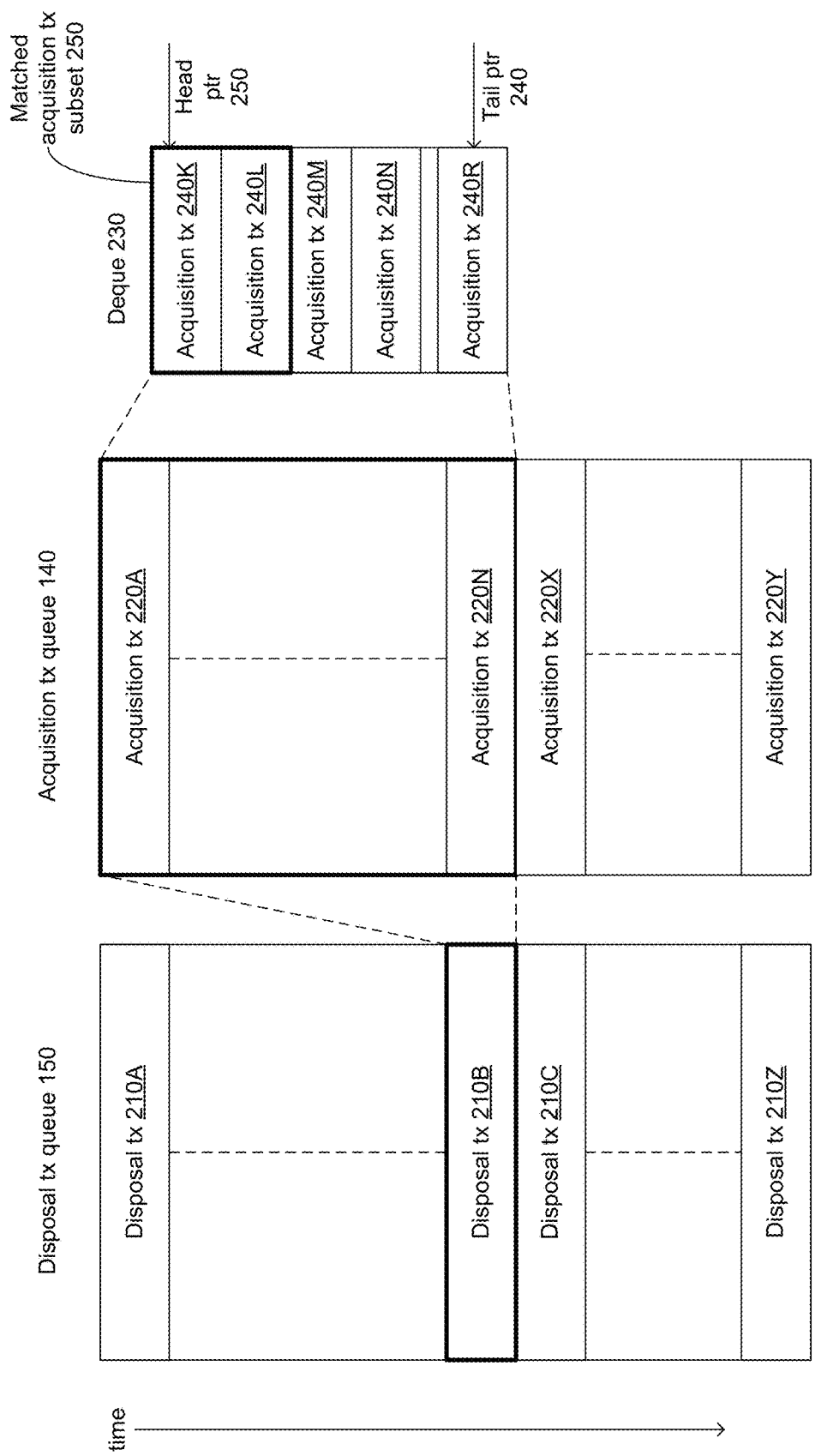
FIG. 2 schematically illustrates data structures employed for disposal and acquisition transaction matching, in accordance with one or more aspects of the present disclosure.

Accordingly, as schematically illustrated by FIG. 2, the transaction matching engine 160 may traverse the disposal transaction queue 150 starting from the least recent transactions, and for each disposal transaction 210 (e.g., for disposal transaction 210B) may select a subset of acquisition transactions 220A-220N from the acquisition transaction queue 140, such that the timestamp of each identified acquisition transaction 220A-220N is less than the timestamp of the currently selected disposal transaction 210B. Since both transaction queues 140 and 150 are sorted in the ascending order of transaction timestamps, the transaction matching engine 160 may traverse the acquisition queue 140 starting from the least recent transactions until an acquisition transaction 220X is identified, such that the timestamp of the acquisition transaction 220X exceeds or is equal to the timestamp of the currently selected disposal transaction 210B. Accordingly, all the acquisition transactions 220A-220N in the acquisition queue 140, starting from the least recent transaction 220A and including the transaction 220N which precedes the identified transaction 220X (whose timestamp exceeds or is equal to the timestamp of the currently selected disposal transaction 210B), may be considered as the candidate acquisition transactions for matching with the currently selected disposal transaction 210B.

For improving the efficiency of computations, the transaction matching engine 160 may append the identified acquisition transactions 220A-220N to a double-ended queue (deque) 230 which may reside in the random access memory (RAM) of the computer system running the transaction matching engine 160, thus creating acquisition transactions 240K-240R in the deque 230. While the example implementations herein are described with references to a double-ended queue, a doubly linked list (also referred to as "double-linked list") or another suitable data structure may be employed instead of the deque 230. In a doubly linked list, each list element includes a reference (e.g., a pointer, an address offset or an index into the array implementing the list) to the next element of the list and a reference to the previous element of the list.

The deque 230 may be represented by a queue, to/from which the elements may be added/removed from either the head or the tail of the queue. The deque 230 may preserve the sorting order of the acquisition queue 140, i.e., may store the acquisition transactions sorted in the ascending order of their timestamps. The transaction matching process may thus involve initializing with zero value the running total amount of matched acquisition transactions and traversing the deque 230 in order to identify one or more full or partial acquisitions transactions such that their total amount would be equal to the amount of the currently selected disposal transaction 210B.

In an illustrative example, the relevant accounting rule may prescribe selecting the most recent acquisition transaction first for matching with a given disposal transaction (i.e., last in-first out (LIFO) matching rule). Accordingly, the transaction matching engine 160 may traverse the deque 230 starting from its tail 240.

In another illustrative example, the relevant accounting rule may prescribe selecting the least recent acquisition transaction first for matching with a given disposal transaction (i.e., first in-first out (FIFO) matching rule). Accordingly, the transaction matching engine 160 may traverse the deque 230 starting from its head 250.

Traversing the deque 230 may involve selecting, according to the traversal order, the next available acquisition transaction 240M and comparing the amount of the currently selected acquisition transaction 240M to the difference between the amount of the currently selected disposal transaction 210B and the running total amount of matched acquisition transactions 240K-240L.

Figure 3A:
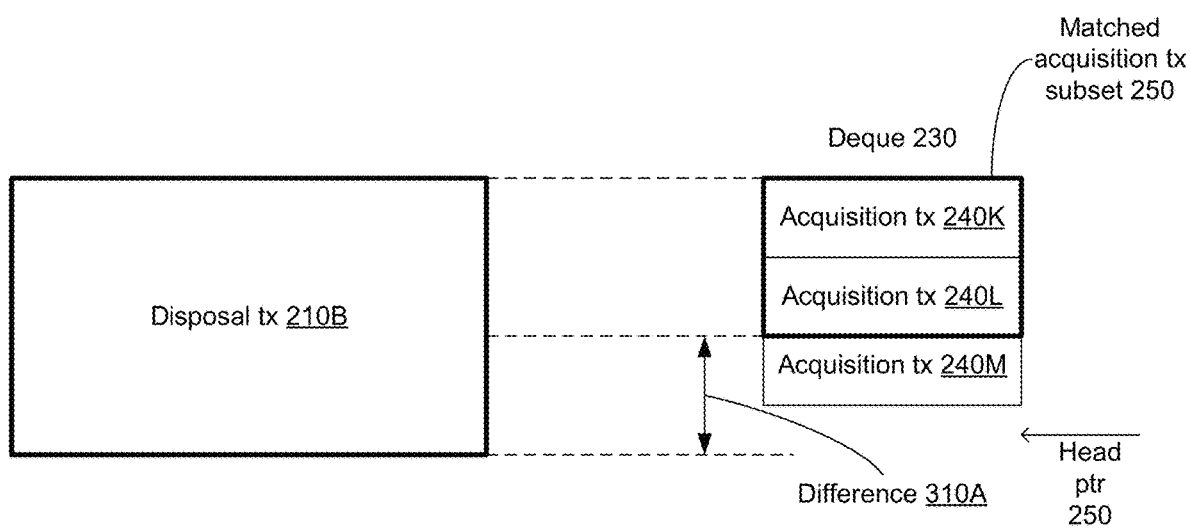
FIGS. 3A-3B schematically illustrate appending the next acquisition transaction to a subset of matched acquisition transactions, in accordance with one or more aspects of the present disclosure.

As schematically illustrated by FIG. 3A, should the amount of the currently selected acquisition transaction 240M be found less than or equal to the difference 310A between the amount of the currently selected disposal transaction 210B and the running total amount of matched acquisition transactions 240K-240L, the transaction 240M is added to the subset 250 of matched acquisition transactions. Accordingly, the amount of the currently selected acquisition transaction 240M is added to the running total amount of matched acquisition transactions 240K-240L. Thus, the currently selected acquisition transaction 240M is removed from the deque 230, and the head pointer 250 is advanced to point to the transaction that follows the transaction 240M in the deque 230.

Accordingly, should the total amount of matched acquisition transactions 240K-240M after performing the matching operation fall short of the amount of the currently selected disposal transaction 210B, the current acquisition transaction pointer in the deque 230 is advanced to point to the next acquisition transaction, and the next matching iteration is performed for the next acquisition transaction. Otherwise, should performing the matching operation set the running total amount of matched acquisition transactions 240K-240M equal to the amount of the currently selected disposal transaction 210B, the current transaction pointer in the disposal queue 150 is advanced to point to the next disposal transaction 210C, and the matching operations are performed for the next disposal transaction 210C.

Figure 3B:
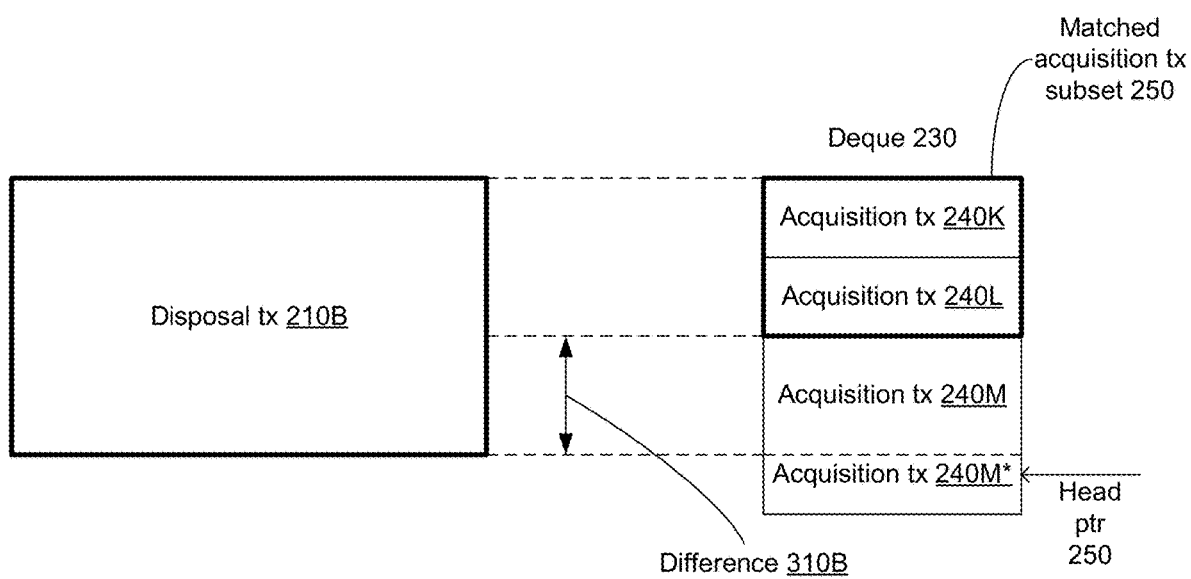

Conversely, as schematically illustrated by FIG. 3B, should the amount of the currently selected acquisition transaction 240M be found exceeding the difference between the amount of the currently selected disposal transaction 210B and the running total amount of matched acquisition transactions 240K-240L, the amount of transaction 240M is reduced by is split into two parts, such that the amount of the first part is equal to the difference 310B between the amount of the currently selected disposal transaction 210B and the running total amount of matched acquisition transactions 240K-240L, while the amount of the second part is equal to the remainder of the initial amount of the transaction 240M. Accordingly, the amount of the first part of the transaction 240M is added to the running total amount of matched acquisition transactions 240K-240L, the amount of the currently selected acquisition transaction 240M is reduced by the difference between the amount of the currently selected disposal transaction 210B and the running total amount of matched acquisition transactions 240K-240L. Thus, the modified transaction 240M* is left in the deque 230, and the head pointer 250 is advanced to point to the modified transaction 240M*.

Referring again to FIG. 1, for each disposal transaction and the matched acquisition transactions, the gain or loss may be computed by the gain/loss computation engine 170, which may be implemented by one or more software modules running in one or more dedicated virtual or physical execution environments (e.g., virtual or physical servers) or collocated with other components of the system. The gain/loss computation may involve determining, for each of the matched disposal and acquisition transactions, the transaction amount in a chosen fiat currency (e.g., U.S. dollars) based on the historic price of the cryptocurrency which has been acquired or disposed by the transaction. "Historic price" herein shall refer to the price which was effective at the time of performing the corresponding disposal or acquisition transaction. Upon determining the historic price-based transaction amounts in the chosen fiat currency, the gain/loss computation engine 170 may compute, for each disposal transaction and the matched acquisition transactions, the resulting gain or loss, by summing up the fiat currency amount of the disposal transaction and the fiat currency amounts of the matched acquisition transactions, such that a positive result would indicate a gain while a negative result would indicate a loss (assuming that the disposal transaction amount is positive, while acquisition transaction amounts are negative).

The computed gains or losses for the matched transactions, as well as other relevant data, may be summarized in one or more reports of various fixed or user-defined formats. The reports may be visually rendered via a graphical user interface (GUI), saved to one or more files, and/or printed. In an illustrative example, the reports may be formatted for rendering via a GUI of a portable computing device (such as a smartphone or a tablet).

In certain implementations, the computer system 100 implementing the methods described herein may utilize the computed gain or losses, as well as other relevant data, for producing one or more electronic tax accounting forms, which may be reviewed and electronically signed by the user. Upon obtaining the user's electronic signature, the computer system 100 may upload the electronic tax accounting forms to a server of a government agency which is authorized to accept electronic tax form filings.

Figure 4:
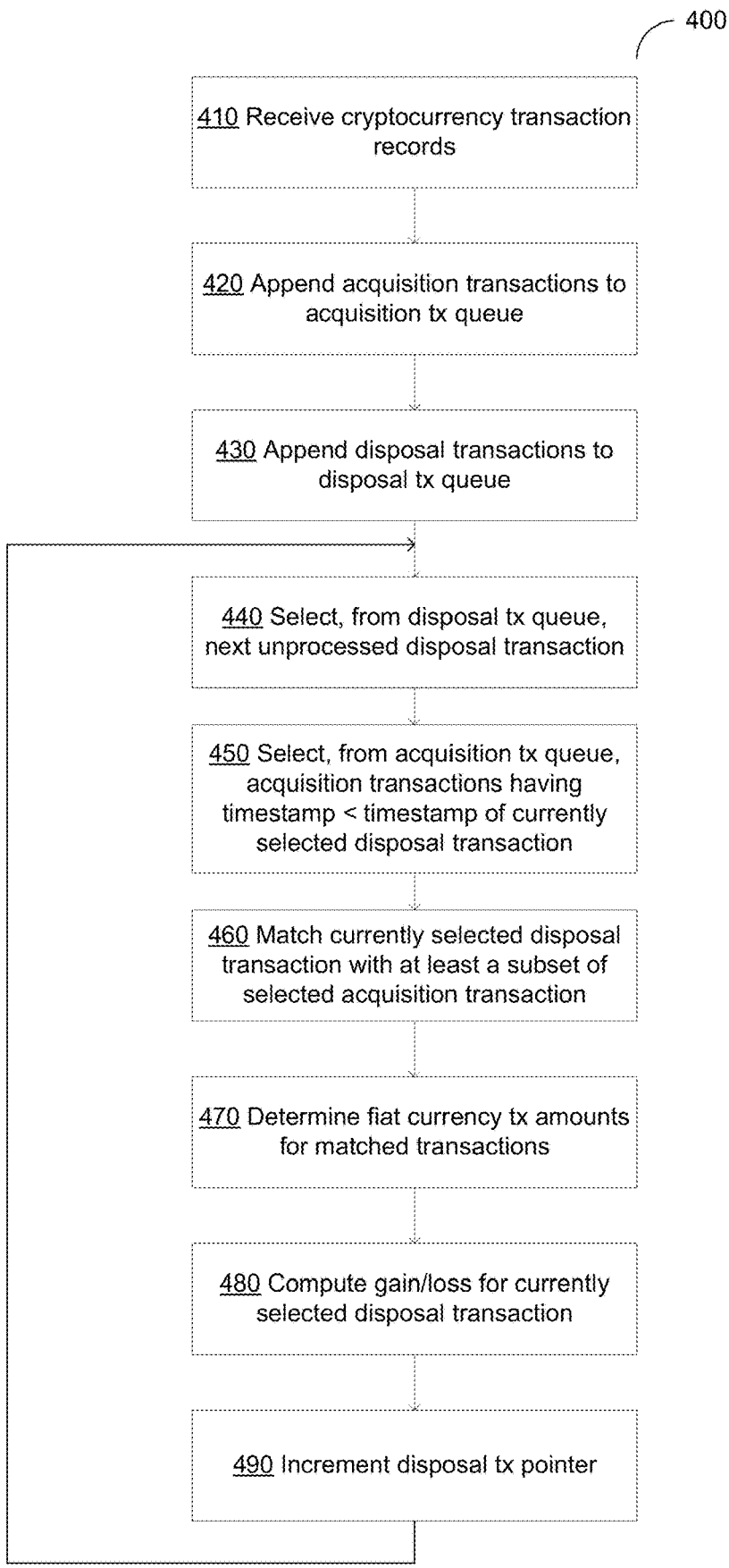
FIG. 4 depicts a flow diagram of an example method of gain and loss computation for cryptocurrency transactions, in accordance with one or more aspects of the present disclosure.

FIG. 4 depicts a flow diagram of an example method 400 of gain and loss computation for cryptocurrency transactions, in accordance with one or more aspects of the present disclosure. Method 400 and/or each of its individual functions, routines, subroutines, or operations may be performed by one or more processors of a computer system (e.g., the example computer system 600 of FIG. 6) implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the computer system implementing the method may receive a plurality of cryptocurrency transaction records related to cryptocurrency trades and transfers performed by a single person (e.g., a natural person or a corporation) via one or more cryptocurrency accounts associated with one or more cryptocurrency exchanges and/or other organizations that perform cryptocurrency transactions, as described in more detail herein above.

At block 420, the computer system may select, among the received transaction records, cryptocurrency acquisition transactions, which may be appended, in the ascending order of the respective transaction timestamps, to the cryptocurrency acquisition transaction queue (or other suitable memory data structure). The queue may be stored in a volatile or non-volatile memory, as described in more detail herein above.

At block 430, the computer system may select, among the received transaction records, cryptocurrency disposal transactions, which may be appended, in the ascending order of the respective transaction timestamps, to the cryptocurrency disposal transaction queue (or other suitable memory data structure). The queue may be stored in a volatile or non-volatile memory, as described in more detail herein above.

At block 440, the computer system may select, from the cryptocurrency disposal transaction queue, the next unprocessed cryptocurrency disposal transaction, as described in more detail herein above.

At block 450, the computer system may select, from the cryptocurrency acquisition transaction queue, one or more cryptocurrency acquisition transactions, such that the timestamp of each selected cryptocurrency acquisition transaction is less than the timestamp of the currently selected cryptocurrency disposal transaction, as described in more detail herein above.

At block 460, the computer system may match the currently selected cryptocurrency disposal transaction with at least a subset of the selected cryptocurrency acquisition transactions, as described in more detail herein below with references to FIG. 5.

At block 470, the computer system may determine, for each of the matched transactions, a corresponding fiat currency transaction amount, based on the historic price of the cryptocurrency which has been acquired or disposed by the respective transaction, as described in more detail herein above.

At block 480, the computer system may compute, based on the determined fiat currency transaction amounts, the gain or loss associated with the currently selected cryptocurrency disposal transaction.

At block 490, the computer system may increment the pointer identifying the next available cryptocurrency disposal transaction in the cryptocurrency disposal transaction queue, and the method may loop back to block 440.

Figure 5:
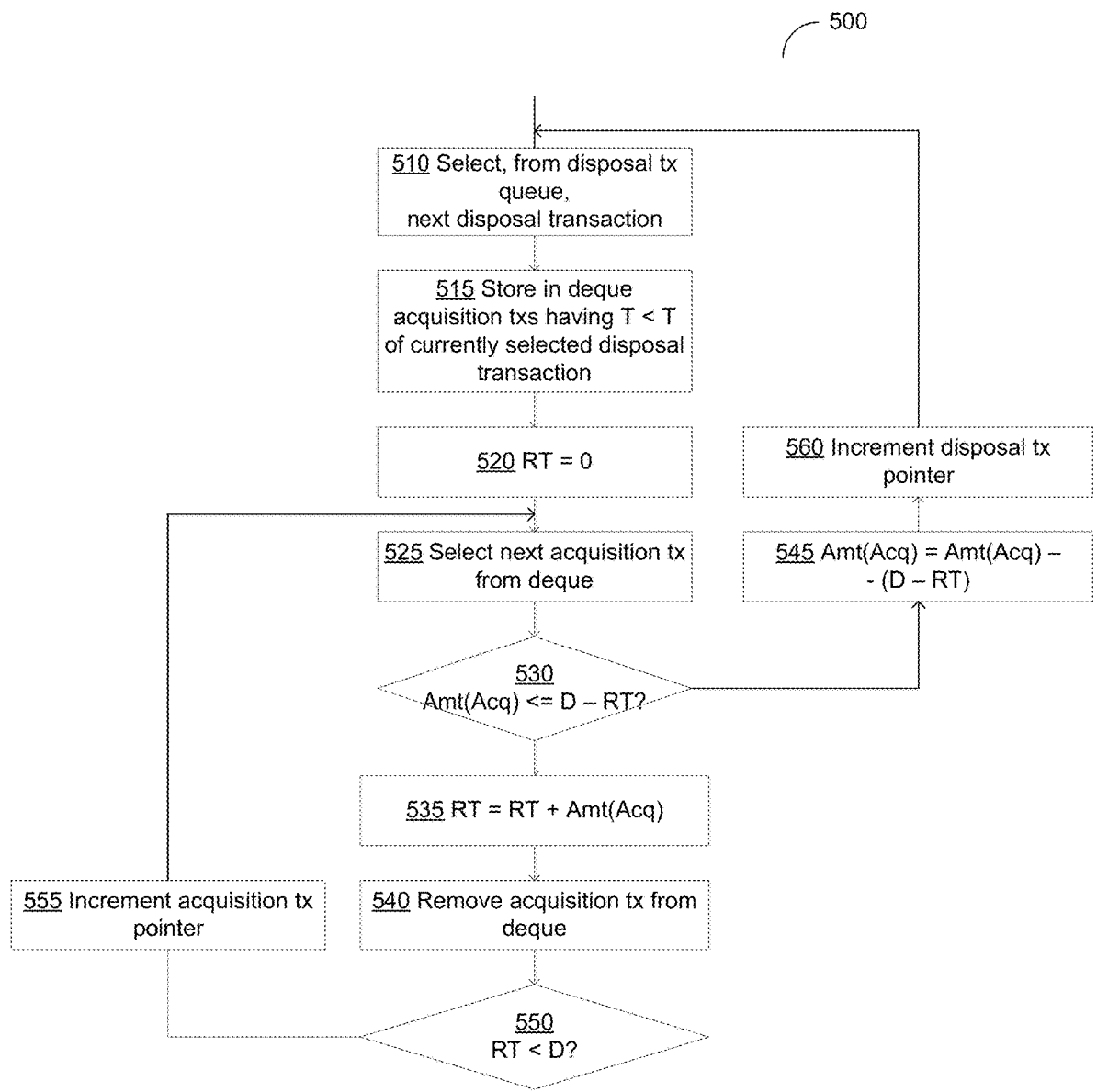
FIG. 5 depicts a flow diagram of an example method of disposal and acquisition transaction matching, in accordance with one or more aspects of the present disclosure.

FIG. 5 depicts a flow diagram of an example method 500 of disposal and acquisition transaction matching, in accordance with one or more aspects of the present disclosure. Method 500 and/or each of its individual functions, routines, subroutines, or operations may be performed by one or more processors of a computer system (e.g., the example computer system 600 of FIG. 6) implementing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, the computer system implementing the method may, select the next unprocessed disposal transaction from the disposal transaction queue (or other suitable data structure), as described in more detail herein above.

At block 515, the computer system implementing the method may, for the currently selected disposal transaction, select a subset of acquisition transactions from the acquisition transaction queue, such that the timestamp of each identified acquisition transaction is less than the timestamp of the currently selected disposal transaction. The selected subset of cryptocurrency acquisition transactions may be stored in a deque or other suitable memory data structure in the ascending order of the respective transaction timestamps, as described in more detail herein above.

At block 520, the computer system may initialize with zero value the running total amount of matched cryptocurrency acquisition transactions.

At block 525, the computer system may select the next available acquisition transaction, by traversing the deque in the direction defined by the applicable accounting rule (FIFO or LIFO), as described in more detail herein above.

Responsive to determining, at block 530, that the amount of the selected cryptocurrency acquisition transaction is less than or equal to the difference between the amount of the selected cryptocurrency disposal transaction and the running total amount of matched cryptocurrency acquisition transactions, the computer system may, at block 535, add the amount of the selected cryptocurrency acquisition transaction to the running total amount of matched cryptocurrency acquisition transactions; otherwise, the processing may continue at block 545.

At block 540, the computer system may remove the currently selected cryptocurrency acquisition transaction from the deque.

Responsive to determining, at block 550, that the running total amount of matched cryptocurrency acquisition transactions falls short of the amount of the currently selected cryptocurrency disposal transaction, the computer system may, at block 555, advance the pointer referencing the next available cryptocurrency acquisition transaction in the deque, and the method may loop back to block 525.

Responsive to determining, at block 530, that the amount of the selected cryptocurrency acquisition transaction exceeds the difference between the amount of the selected cryptocurrency disposal transaction and the running total amount of matched cryptocurrency acquisition transactions, the computer system may, at block 545, reduce the amount of the selected cryptocurrency acquisition transaction by the difference between the amount of the selected cryptocurrency disposal transaction and the running total amount of matched cryptocurrency acquisition transactions.

At block 560, the computer system may advance the pointer referencing the next available cryptocurrency disposal transaction in the cryptocurrency disposal transaction queue, and the method may loop back to 510.

The systems and methods described herein may be employed for processing real or simulated data sets. In an illustrative example, the output produced by the systems and methods described herein may be employed for various cryptocurrency market simulation applications. e.g., cryptocurrency market simulation). In an illustrative example, the output produced by the systems and methods described herein may be employed for generating training data sets for various machine learning-based applications.

Figure 6:
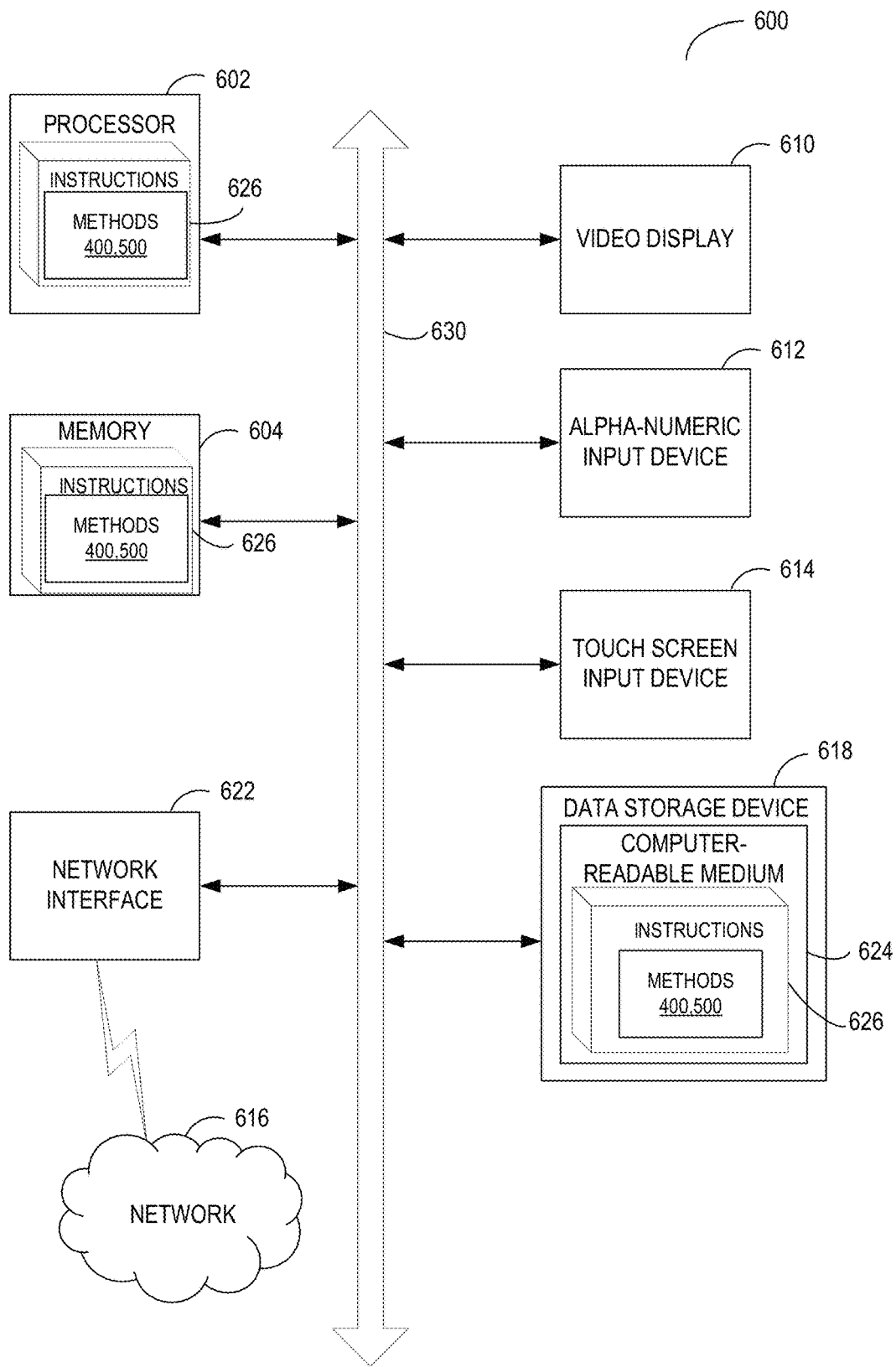
FIG. 6 schematically illustrates a component diagram of an example wireless lighting control network node operating in accordance with one or more aspects of the present disclosure.

FIG. 6 depicts a component diagram of an example computer system which may be employed for implementing the methods described herein. The computer system 600 may be connected to other computer system in a LAN, an intranet, an extranet, or the Internet. The computer system 600 may operate in the capacity of a server or a client computer system in client-server network environment, or as a peer computer system in a peer-to-peer (or distributed) network environment. The computer system 600 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methods described herein.

Exemplary computer system 600 includes a processor 602, a main memory 604 (e.g., read-only memory (ROM) or dynamic random access memory (DRAM)), and a data storage device 618, which communicate with each other via a bus 630.

Processor 602 may be represented by one or more general-purpose processing devices such as a microprocessor, central processing unit, or the like. More particularly, processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute instructions 626 for performing the methods described herein.

Computer system 600 may further include a network interface device 622, a video display unit 610, a character input device 612 (e.g., a keyboard), and a touch screen input device 614.

Data storage device 618 may include a computer-readable storage medium 624 on which is stored one or more sets of instructions 626 embodying any one or more of the methods or functions described herein. Instructions 626 may also reside, completely or at least partially, within main memory 604 and/or within processor 602 during execution thereof by computer system 600, main memory 604 and processor 602 also constituting computer-readable storage media. Instructions 626 may further be transmitted or received over network 616 via network interface device 622.

In an illustrative example, instructions 626 may include instructions of methods 400, 500 of gain and loss computation for cryptocurrency transactions, implemented in accordance with one or more aspects of the present disclosure. While computer-readable storage medium 624 is shown in the example of FIG. 6 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, graphemes, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:

storing, by a computer system, in an acquisition transaction queue, a plurality of cryptocurrency acquisition transactions in an ascending order of respective transaction timestamps;

storing, in a disposal transaction queue, a plurality of cryptocurrency disposal transactions in an ascending order of respective transaction timestamps;

selecting a cryptocurrency disposal transaction of the plurality of cryptocurrency disposal transactions;

selecting, from the plurality of cryptocurrency acquisition transactions, one or more candidate cryptocurrency acquisition transactions, such that a timestamp of each candidate cryptocurrency acquisition transaction is less than a timestamp of the cryptocurrency disposal transaction;

storing the one or more candidate cryptocurrency acquisition transactions in a double-ended queue that preserves a sorting order of the acquisition transaction queue, wherein the double-ended queue has a head pointer and a tail pointer;

matching, by traversing the double-ended queue in a direction defined by an applicable accounting rule, the selected cryptocurrency disposal transaction with at least a subset of the one or more candidate cryptocurrency acquisition transactions, wherein the matching further comprises:

selecting a cryptocurrency acquisition transaction from the double-ended queue;

responsive to determining that an amount of the selected cryptocurrency acquisition transaction is less than or equal to a difference between an amount of the selected cryptocurrency disposal transaction and a running total amount of matched cryptocurrency acquisition transactions:

increasing the running total amount of matched cryptocurrency acquisition transactions by the amount of the selected cryptocurrency acquisition transaction;

removing the selected cryptocurrency acquisition transaction from the double-ended queue; and advancing the head pointer of the double-ended queue to a transaction that follows the selected cryptocurrency acquisition transaction;
responsive to determining that the amount of the selected cryptocurrency acquisition transaction exceeds the difference between the amount of the selected cryptocurrency disposal transaction and the running total amount of matched cryptocurrency acquisition transactions:
  modifying the selected cryptocurrency acquisition transaction by reducing the amount of the selected cryptocurrency acquisition transaction by the difference between the amount of the selected cryptocurrency disposal transaction and the running total amount of matched cryptocurrency acquisition transactions;
  leaving the modified cryptocurrency acquisition transaction in the double-ended queue; and
  advancing the head pointer of the double-ended queue to point to the modified cryptocurrency acquisition transaction;
responsive to determining that the running total amount of matched cryptocurrency acquisition transactions, after performing the matching, is less than the amount of the selected cryptocurrency disposal transaction:
  updating a current acquisition transaction pointer in the double-ended queue to point to a next acquisition transaction such that a next matching operation is performed for a next acquisition target;
responsive to determining that the running total amount of matched cryptocurrency acquisition transactions, after performing the matching, is equal to the amount of the selected cryptocurrency disposal transaction:
  updating a current transaction pointer in the disposal queue to point to a next disposal transaction such that a next matching operation is performed for the next disposal target;
determining, for each of the matched transactions, a corresponding fiat currency transaction amount;
computing, using the fiat currency transaction amounts, one of: a gain associated with the selected cryptocurrency disposal transaction or a loss associated with the selected cryptocurrency disposal transaction; and
generating a report reflecting one of: the gain associated with the selected cryptocurrency disposal transaction or the loss associated with the selected cryptocurrency disposal transaction.

2. The method of claim 1, further comprising:
responsive to determining that the amount of the selected cryptocurrency disposal transaction exceeds the running total amount of matched cryptocurrency acquisition transactions, selecting a next cryptocurrency acquisition transaction from the double-ended queue.

3. The method of claim 1, further comprising:
selecting a next cryptocurrency disposal transaction of the plurality of cryptocurrency disposal transactions.

4. The method of claim 1, wherein the fiat currency transaction amount is based on a fiat currency price of a cryptocurrency identified by the transaction, wherein the fiat currency price was effective at a time identified by a timestamp of the transaction.

5. The method of claim 1, wherein computing the gain further comprises:
summing the fiat currency transaction amounts of the matched cryptocurrency acquisition transactions and the fiat currency transaction amount of the selected cryptocurrency disposal transaction.

6. The method of claim 1, further comprising:
generating an electronic tax accounting form reflecting one of: the gain associated with the selected cryptocurrency disposal transaction or the loss associated with the selected cryptocurrency disposal transaction;
responsive to receiving, via a graphical user interface, an approval of the electronic tax accounting form, digitally signing the electronic tax accounting form; and
uploading the electronic tax accounting form to a server authorized to accept electronic tax form filings.

7. The method of claim 1, further comprising:
utilizing, for training a machine learning-based application, a data set comprising one of: the gain associated with the selected cryptocurrency disposal transaction or the loss associated with the selected cryptocurrency disposal transaction.

8. A system, comprising:
at least one memory; and
at least one processor, coupled to the at least one memory, wherein the at least one processor is configured to:
  store, in an acquisition transaction queue, a plurality of cryptocurrency acquisition transactions in an ascending order of respective transaction timestamps;
  store, in a disposal transaction queue, a plurality of cryptocurrency disposal transactions in an ascending order of respective transaction timestamps;
  selecting a cryptocurrency disposal transaction of the plurality of cryptocurrency disposal transactions;
  select, from the plurality of cryptocurrency acquisition transactions, one or more candidate cryptocurrency acquisition transactions, such that a timestamp of each candidate cryptocurrency acquisition transaction is less than a timestamp of the selected cryptocurrency disposal transaction;
  store the one or more candidate cryptocurrency acquisition transactions in a double-ended queue that preserves a sorting order of the acquisition transaction queue wherein the double-ended queue has a head pointer and a tail pointer;
  match, by traversing the double-ended queue in a direction defined by an applicable accounting rule, the selected cryptocurrency disposal transaction with at least a subset of the one or more candidate cryptocurrency acquisition transactions, wherein the matching further comprises:
    selecting a cryptocurrency acquisition transaction from the double-ended queue;
    responsive to determining that an amount of the selected cryptocurrency acquisition transaction is less than or equal to a difference between an amount of the selected cryptocurrency disposal transaction and a running total amount of matched cryptocurrency acquisition transactions:
      increase the running total amount of matched cryptocurrency acquisition transactions by the amount of the selected cryptocurrency acquisition transaction;
      remove the selected cryptocurrency acquisition transaction from the double-ended queue; and
      advance the head pointer of the double-ended queue to a transaction that follows the selected cryptocurrency acquisition transaction;
    responsive to determining that the amount of the selected cryptocurrency acquisition transaction exceeds the difference between the amount of the selected cryptocurrency disposal transaction and the running total amount of matched cryptocurrency acquisition transactions:
  modify the selected cryptocurrency acquisition transaction by reducing the amount of the selected cryptocurrency acquisition transaction by the difference between the amount of the selected cryptocurrency disposal transaction and the running total amount of matched cryptocurrency acquisition transactions;
  leave the modified cryptocurrency acquisition transaction in the double-ended queue; and
  advance the head pointer of the double-ended queue to point to the modified cryptocurrency acquisition transaction;
responsive to determining that the running total amount of matched cryptocurrency acquisition transactions, after performing the matching, is less than the amount of the selected cryptocurrency disposal transaction:
  update a current acquisition transaction pointer in the double-ended queue to point to a next acquisition transaction such that a next matching operation is performed for a next acquisition target;
responsive to determining that the running total amount of matched cryptocurrency acquisition transactions, after performing the matching, is equal to the amount of the selected cryptocurrency disposal transaction:
  update a current transaction pointer in the disposal queue to point to a next disposal transaction such that a next matching operation is performed for the next disposal target;
determine, for each of the matched transactions, a corresponding fiat currency transaction amount;
compute, using the fiat currency transaction amounts, one of: a gain associated with the selected cryptocurrency disposal transaction or a loss associated with the selected cryptocurrency disposal transaction; and
generate a report reflecting one of: the gain associated with the selected cryptocurrency disposal transaction or the loss associated with the selected cryptocurrency disposal transaction.

9. The system of claim 8, wherein the fiat currency transaction amount is based on a fiat currency price of a cryptocurrency identified by the transaction, wherein the fiat currency price was effective at a time identified by a timestamp of the transaction.

10. The system of claim 8, wherein computing the gain further comprises:
summing the fiat currency transaction amounts of the matched cryptocurrency acquisition transactions and the fiat currency transaction amount of the selected cryptocurrency disposal transaction.

11. The system of claim 8, wherein the processor is further configured to:
generate an electronic tax accounting form reflecting one of: the gain associated with the selected cryptocurrency disposal transaction or the loss associated with the selected cryptocurrency disposal transaction;
responsive to receiving, via a graphical user interface, an approval of the electronic tax accounting form, digitally sign the electronic tax accounting form; and
upload the electronic tax accounting form to a server authorized to accept electronic tax form filings.

12. A non-transitory computer-readable storage medium comprising executable instructions that, when executed by a computer system, cause the computer system to:

store, in an acquisition transaction queue, a plurality of cryptocurrency acquisition transactions in an ascending order of respective transaction timestamps;
store, in a disposal transaction queue, a plurality of cryptocurrency disposal transactions in an ascending order of respective transaction timestamps;
select a cryptocurrency disposal transaction of the plurality of cryptocurrency disposal transactions;
select, from the plurality of cryptocurrency acquisition transactions, one or more candidate cryptocurrency acquisition transactions, such that a timestamp of each candidate cryptocurrency acquisition transaction is less than a timestamp of the selected cryptocurrency disposal transaction;
store the one or more candidate cryptocurrency acquisition transactions in a double-ended queue that preserves a sorting order of the acquisition transaction queue,
  wherein the double-ended queue has a head pointer and a tail pointer;
match, by traversing the double-ended queue in a direction defined by an applicable accounting rule, the selected cryptocurrency disposal transaction with at least a subset of the one or more candidate cryptocurrency acquisition transactions, wherein the matching further comprises:
  selecting a cryptocurrency acquisition transaction from the double-ended queue;
  responsive to determining that an amount of the selected cryptocurrency acquisition transaction is less than or equal to a difference between an amount of the selected cryptocurrency disposal transaction and a running total amount of matched cryptocurrency acquisition transactions:
    increasing the running total amount of matched cryptocurrency acquisition transactions by the amount of the selected cryptocurrency acquisition transaction;
    removing the selected cryptocurrency acquisition transaction from the double-ended queue; and
    advancing the head pointer of the double-ended queue to a transaction that follows the selected cryptocurrency acquisition transaction;
  responsive to determining that the amount of the selected cryptocurrency acquisition transaction exceeds the difference between the amount of the selected cryptocurrency disposal transaction and the running total amount of matched cryptocurrency acquisition transactions:
    modifying the selected cryptocurrency acquisition transaction by reducing the amount of the selected cryptocurrency acquisition transaction by the difference between the amount of the selected cryptocurrency disposal transaction and the running total amount of matched cryptocurrency acquisition transactions;
    leaving the modified cryptocurrency acquisition transaction in the double-ended queue; and
    advancing the head pointer of the double-ended queue to point to the modified cryptocurrency acquisition transaction;
responsive to determining that the running total amount of matched cryptocurrency acquisition transactions, after performing the matching, is less than the amount of the selected cryptocurrency disposal transaction:
  updating a current acquisition transaction pointer in the double-ended queue to point to a next acquisition transaction such that a next matching operation is performed for a next acquisition target;

responsive to determining that the running total amount of matched cryptocurrency acquisition transactions, after performing the matching, is equal to the amount of the selected cryptocurrency disposal transaction:

updating a current transaction pointer in the disposal queue to point to a next disposal transaction such that a next matching operation is performed for the next disposal target;

determine, for each of the matched transactions, a corresponding fiat currency transaction amount;

compute, using the fiat currency transaction amounts, one of: a gain associated with the selected cryptocurrency disposal transaction or a loss associated with the selected cryptocurrency disposal transaction; and generate a report reflecting one of: the gain associated with the selected cryptocurrency disposal transaction or the loss associated with the selected cryptocurrency disposal transaction.

13. The non-transitory computer-readable storage medium of claim 12, wherein computing the gain further comprises:

summing the fiat currency transaction amounts of the matched cryptocurrency acquisition transactions and the fiat currency transaction amount of the selected cryptocurrency disposal transaction.

14. The non-transitory computer-readable storage medium of claim 12, to further comprising executable instructions that, when executed by the computer system, cause the computer system to:

generate an electronic tax accounting form reflecting one of: the gain associated with the selected cryptocurrency disposal transaction or the loss associated with the selected cryptocurrency disposal transaction;

responsive to receiving, via a graphical user interface, an approval of the electronic tax accounting form, digitally sign the electronic tax accounting form; and upload the electronic tax accounting form to a server authorized to accept electronic tax form filings.

15. The method of claim 1, further comprising:

responsive to determining that an amount of a selected cryptocurrency acquisition transaction is less than or equal to a difference between an amount of the selected cryptocurrency disposal transaction and the running total amount of matched cryptocurrency acquisition transactions, adding the amount of the selected cryptocurrency acquisition transaction to the running total amount of matched cryptocurrency acquisition transactions.

16. The system of claim 8, wherein the processor is further configured to:

responsive to determining that an amount of a selected cryptocurrency acquisition transaction is less than or equal to a difference between an amount of the selected cryptocurrency disposal transaction and the running total amount of matched cryptocurrency acquisition transactions, add the amount of the selected cryptocurrency acquisition transaction to the running total amount of matched cryptocurrency acquisition transactions.

17. The non-transitory computer-readable storage medium of claim 12, wherein the fiat currency transaction amount is based on a fiat currency price of a cryptocurrency identified by the transaction, wherein the fiat currency price was effective at a time identified by a timestamp of the transaction.

18. The non-transitory computer-readable storage medium of claim 12, further comprising executable instructions that, when executed by the computer system, cause the computer system to:

responsive to determining that an amount of a selected cryptocurrency acquisition transaction is less than or equal to a difference between an amount of the selected cryptocurrency disposal transaction and the running total amount of matched cryptocurrency acquisition transactions, add the amount of the selected cryptocurrency acquisition transaction to the running total amount of matched cryptocurrency acquisition transactions.

19. The method of claim 1, further comprising:

responsive to determining that the amount of the selected cryptocurrency acquisition transaction exceeds the difference between the amount of the selected cryptocurrency disposal transaction and the running total amount of matched cryptocurrency acquisition transactions, setting a pointer associated with the double-ended queue to point to the selected cryptocurrency acquisition transaction with the reduced amount.

20. The method of claim 1, further comprising:

validating the plurality of cryptocurrency acquisition transactions and the plurality of cryptocurrency disposal transactions by normalizing respective cryptocurrency designators.

* * * * *